(12) United States Patent
Iwata et al.

(10) Patent No.: US 6,739,998 B2
(45) Date of Patent: May 25, 2004

(54) HYDRAULIC CONTROLLER FOR AN AUTOMATIC TRANSMISSION

(75) Inventors: Akihito Iwata, Anjo (JP); Junichi Tokunaga, Anjo (JP); Hiroshi Tanaka, Anjo (JP); Ryoji Habuchi, Toyota (JP)

(73) Assignees: Aisin AW Co., Ltd. (JP); Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 10/303,049

(22) Filed: Nov. 25, 2002

(65) Prior Publication Data

US 2003/0119618 A1 Jun. 26, 2003

(30) Foreign Application Priority Data

Dec. 26, 2001 (JP) ........................................ 2001-395297

(51) Int. Cl.⁷ .............................................. F16H 61/00
(52) U.S. Cl. ...................... 475/127; 475/210; 477/45; 192/3.58
(58) Field of Search ................. 192/3.57, 3.58, 192/85 R; 477/45; 475/116, 127, 210

(56) References Cited

U.S. PATENT DOCUMENTS

| 6,319,164 B1 | * | 11/2001 | Runde et al. | ................ | 475/116 |
| 6,612,958 B2 | * | 9/2003 | Imai et al. | ................... | 475/210 |
| 2003/0083169 A1 | * | 5/2003 | Iwata et al. | .................. | 475/208 |

FOREIGN PATENT DOCUMENTS

JP           2003194199 A   *   7/2003   ........... F16H/61/00

* cited by examiner

*Primary Examiner*—Richard M. Lorence
(74) *Attorney, Agent, or Firm*—Lorusso, Loud & Kelly

(57) ABSTRACT

When an SLT pressure of a linear solenoid valve is input into a control oil chamber of a garage shift control valve, and a direct control pressure from the garage shift control valve is output to a clutch or a brake, a hydraulic controller inputs the direct control pressure into a control oil chamber and executes feedback-control. Also, when a range pressure of a clutch modulator valve is output to the clutch or the brake by switching the garage shift valve, the hydraulic controller inputs the range pressure, which is higher than the SLT pressure, into the control oil chamber and fixes the garage shift control valve.

4 Claims, 4 Drawing Sheets

HYDRAULIC CONTROLLER FOR AN AUTOMATIC TRANSMISSION

BACKGROUND OF THE INVENTION

1. Field of Invention

The present invention relates to a hydraulic controller for an automatic transmission mounted on a vehicle or the like, and more particularly to a hydraulic controller capable of fixing a control valve utilizing a switching valve when a hydraulic pressure output from the control valve is not used.

2. Description of Related Art

FIG. 3 shows a hydraulic circuit of a conventional hydraulic controller 100 for an automatic transmission, and FIG. 4 is a schematic diagram showing a part of the hydraulic circuit shown in FIG. 3.

In FIG. 3, reference numeral 87 denotes an oil temperature sensor and reference numeral 89 denotes a pressure sensor.

A linear solenoid valve SLT outputs a signal pressure (SLT pressure) Pslt, based on a throttle opening or the like, to oil passages a1, a2. A clutch modulator valve 76 adjusts a line pressure PL from a hydraulic pressure generating source (not shown) and outputs it as a range pressure (clutch modulator pressure) Pcmod to oil passages c2, c3 and c5 through oil passages c1, c4 and a strainer 85. A solenoid modulator valve 83 reduces the range pressure of the oil passage c5 by a predetermined amount and outputs it as a solenoid modulator pressure to oil passages g1, g2 and solenoid valves SOL, SOL2. A secondary sheave control valve 73 adjusts the line pressure PL to a secondary sheave pressure and outputs it to a hydraulic actuator for a secondary sheave 35 of a continuously variable transmission mechanism, based on the solenoid modulator pressure from the oil passage g2 and the SLT pressure Pslt from the oil passage a1.

Also, as shown in FIGS. 3 and 4, a garage shift control valve 77 adjusts the range pressure from an oil passage c4, based on the SLT pressure Pslt from the oil passage a2, to provide a direct control pressure through an oil passage k1 for directly controlling the engagement state of a clutch C1 or a brake B1. A garage shift valve 79 switches between the range pressure Pcmod from the oil passage c2 and direct control pressure from the oil passage k1, based on the signal pressures Psol1, Psol2 of the solenoid valves SOL, SOL2, for output to the oil passage 1. A manual shift valve 75 which is moved by operation of a shift lever (not shown) and outputs the range pressure or the direct control pressure of the oil passage 1 to a hydraulic servo 30 of the clutch C1 through an oil passage d in drive (D range) and to a hydraulic servo 31 of the brake B1 through an oil passage e in reverse (R range).

A feedback pressure is input through the oil passage k2, while the direct control pressure is output to the oil passage k1 from the garage shift control valve 77, counter to the SLT pressure Pslt from the oil passage a2 in the valve 77, to provide feedback control of the direct control pressure. The feedback pressure is input into a clutch modulator valve 76, a solenoid modulator valve 83 and a secondary sheave control valve 73, as well as the garage shift control valve 77.

In the above hydraulic controller 100, a shift lever (not shown) may be positioned so that direct control pressure from the garage shift control valve 77 is supplied to a hydraulic servo 30 of the clutch C1 or to a hydraulic servo 31 of the brake B1 through a garage shift valve 79, to control the engagement state of the clutch C1 or the brake B1. When the vehicle starts to run, the garage shift valve 79 is switched to supply a range pressure Pcmod from the clutch modulator valve 76 to the hydraulic servo 30 of the clutch C1 or to the hydraulic servo 31 of the brake B1, to bring the clutch C1 or the brake B1 into a completely engaged state.

However, as shown in FIG. 3, even when the range pressure Pcmod of the clutch modulator valve 76 is supplied to the clutch C1 or the brake B1, the garage shift control valve 77 is simultaneously controlled by the linear solenoid valve SLT through an oil passage a2, since the linear solenoid valve SLT controls the secondary sheave control valve 73 and a secondary sheave 35 of a continuously variable transmission mechanism. During such control the range pressure Pcmod supplied from the clutch modulator valve 76 through an oil passage c4 is repeatedly adjusted based on the SLT pressure of the linear solenoid valve SLT, output to an oil passage k1, feedback-controlled through an oil passage k2, and drained from the drain port EX to a low hydraulic pressure.

Even though output of the garage shift control valve 77 is shut off by the garage shift valve 79, and pressure adjustment of the garage shift control valve 77 is not required, oil supplied from an oil pump (not shown) through the clutch modulator valve 76 and the oil passage c4 is unnecessarily drained to the drain port EX, which increases oil consumption in the hydraulic controller 100, and results in reduction of fuel economy due to upsizing of the oil pump or decreased efficiency of the oil pump.

SUMMARY OF THE PRESENT INVENTION

The present invention provides a hydraulic controller for an automatic transmission which feedback-controls a first control valve through an oil passage when a switching valve outputs a hydraulic pressure output from the first control valve, and fixes the first control valve through that same oil passage when the switching valve outputs a hydraulic pressure of a hydraulic pressure generating source.

More specifically, the present invention provides a hydraulic controller for an automatic transmission which includes a hydraulic pressure generating source which outputs a first hydraulic pressure, a solenoid valve which outputs a signal pressure, a first control valve, and a switching valve. The first control valve includes a first oil chamber and a second oil chamber, arranged opposed to the first oil chamber. The signal pressure of the solenoid valve is received into the first oil chamber, and the first control valve adjusts the first hydraulic pressure of the hydraulic pressure generating source, in accordance with the signal pressure, and outputs the adjusted pressure as a second hydraulic pressure.

The switching valve receives the first and second hydraulic pressures and switches between and outputs one of these received hydraulic pressures, with the output of the switching valve passing through an oil passage into the second oil chamber of the first control valve.

When the switching valve outputs the second hydraulic pressure from the first control valve, the hydraulic controller utilizes that second (adjusted) hydraulic pressure for feedback control by supplying it to the second oil chamber of the first control valve. On the other hand, when the switching valve outputs the first hydraulic pressure (for example, Pcmod) from the hydraulic pressure generating source, the hydraulic controller for an automatic transmission supplies that first hydraulic pressure (for example, Pemod) to the second oil chamber to fix the first control valve.

Therefore, the hydraulic controller according to the present invention includes an oil passage which supplies the output of the switching valve to the second oil chamber of the first control valve. When the switching valve outputs the second hydraulic pressure from the first control valve, the hydraulic controller routes that second (adjusted) hydraulic pressure to the second oil chamber for feedback-control of the first control valve, and when the switching valve outputs the first hydraulic pressure of the hydraulic pressure generating source, the hydraulic controller routes that first hydraulic pressure of the hydraulic pressure generating source to the second oil chamber to fix the first control valve. Therefore, when the second hydraulic pressure output from the first control valve is used, a feedback-control is established, and when the first hydraulic pressure output from the first control valve is not used, the first control valve can be fixed. This prevents unnecessary oil drainage without adjusting the pressure of the first control valve, which results in a reduction of oil consumption in the hydraulic controller and in enhancement of fuel economy due to use of a smaller size oil pump and/or increased efficiency of the oil pump.

The hydraulic controller according to the present invention (for example, refer to FIG. 1) may be arranged so that the solenoid valve (SLT) outputs the signal pressure (Pslt) to a plurality of valves (for example, 77, 73). When the solenoid valve outputs the signal pressure to a plurality of valves, for example, when the first valve is not fixed, the first control valve simultaneously adjusts pressure to control the other valves. However, the first control valve can be fixed, which prevents unnecessary oil drainage without adjusting the pressure of the first control valve. This results in a reduction of oil consumption in the hydraulic controller and in enhancement of fuel economy due to capability of using an oil pump of reduced size and increased efficiency.

The hydraulic controller of the present invention in one preferred embodiment is applied to a continuously variable transmission which has a belt running around two pulleys. The effective diameter of at least one pulley is changed to change speed. In this embodiment the controller further includes a hydraulic servo which controls the effective diameter of a pulley responsive to receipt of a hydraulic pressure, and a second control valve which controls the hydraulic pressure supplied to the hydraulic servo, based on a signal pressure of a solenoid valve (SLT). Thus, the solenoid valve (SLT) outputs its signal pressure both to the first control valve and to the second control valve. When the first control valve is not fixed, it simultaneously executes a pressure adjustment when the torque capacity of the pulleys is controlled by the solenoid valve. However, the first control valve can be fixed, which prevents an unnecessary oil drainage without adjusting the pressure of the first control valve. This results in a reduction of an oil consumption in a hydraulic controller for an automatic transmission and enhancement of fuel economy due to a size-reduction in the oil pump and an increased efficiency of the oil pump.

A hydraulic controller according to the present invention may control engagement of friction engagement elements (C1, B1) at the time of starting, and include a pressure regulating valve which adjusts the hydraulic pressure of the hydraulic pressure generating source to a predetermined pressure (Pemod) and outputs it to the first control valve which, in turn, adjusts the hydraulic pressure (Pcmod) received from the pressure regulating valve (76) based on the signal pressure (Pslt) of the solenoid valve (SLT), and outputs it to the friction engagement elements (C1, B1) in starting. Once in motion (running state), a switching valve switches output to the friction engagement elements (C1, B1) from the pressure as adjusted by the first control valve to the hydraulic pressure (Pcmod) as adjusted by the pressure regulating valve. During running, when the first control valve is not fixed, it executes pressure adjustment. However, the first control valve can be fixed, which prevents an unnecessary oil drainage in the running state and results in reduction of an oil consumption and enhancement of fuel economy due to use of a smaller oil pump of increased efficiency.

DETAILED DESCRIPTION OF PREFERRED EMBODIMENT

Preferred embodiments of the present invention will now be described with reference to the accompanying drawings.

Figure 1:
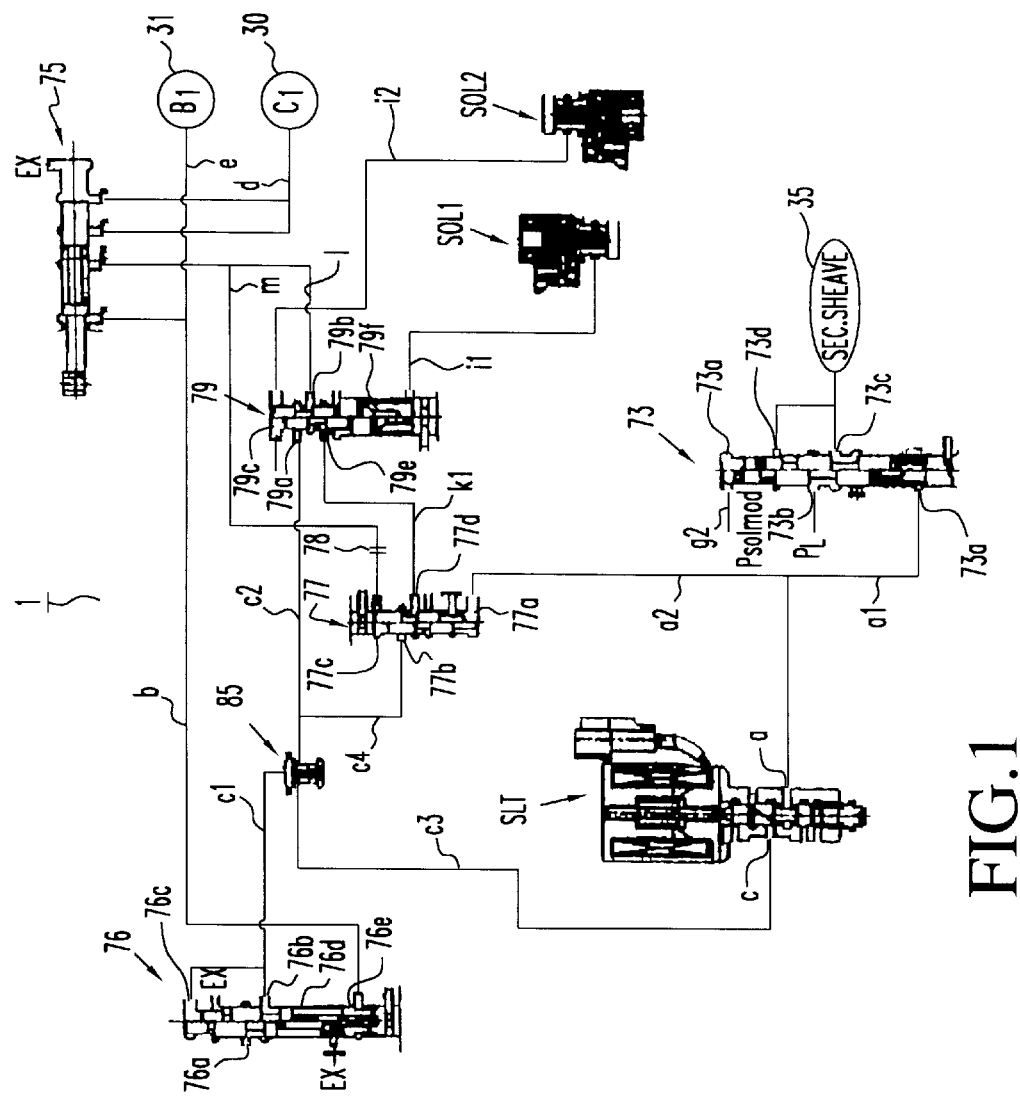
FIG. 1 is a hydraulic circuit diagram of a hydraulic controller for an automatic transmission according to the present invention.
Figure 3:
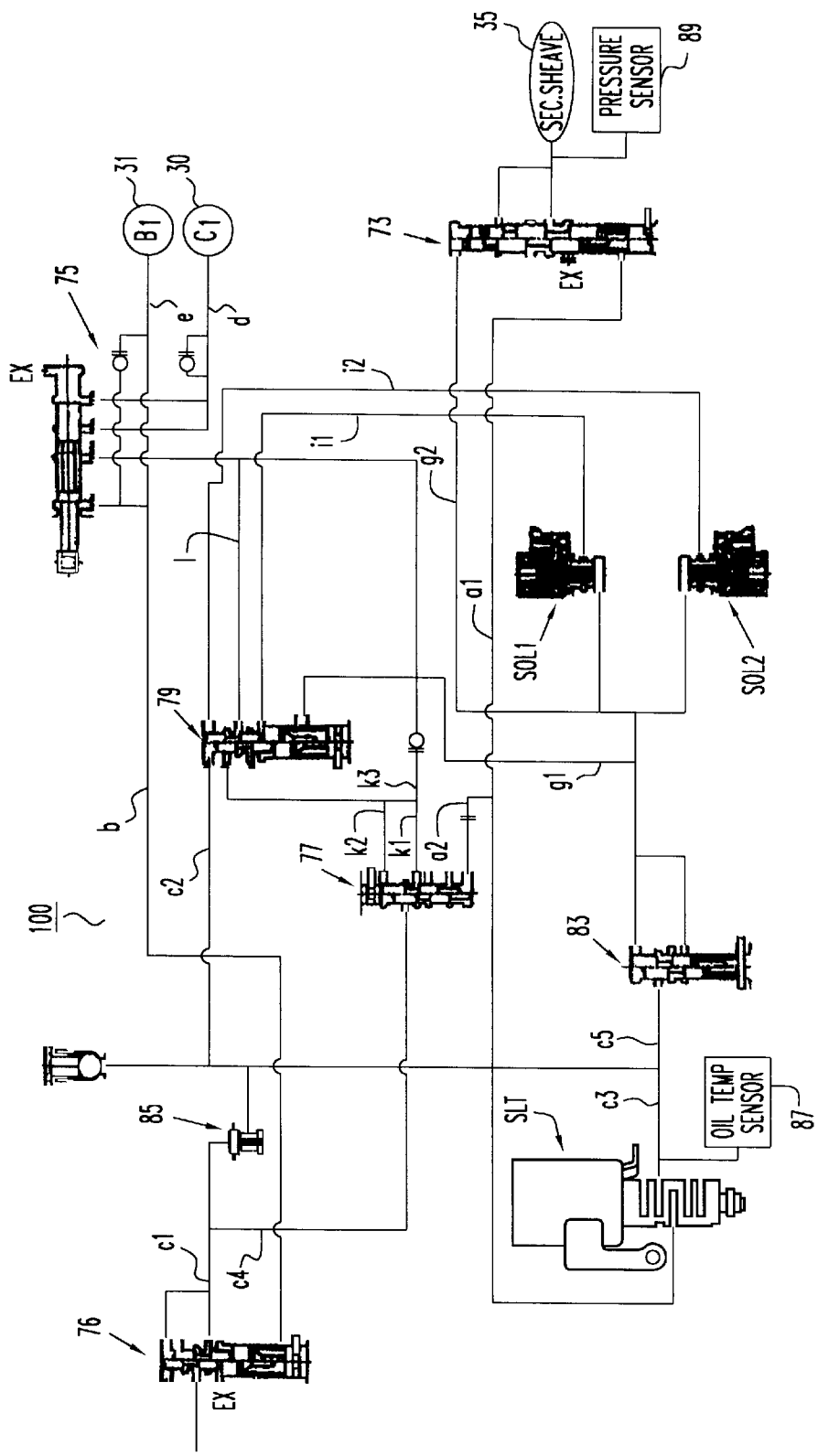
FIG. 3 is a diagram showing the hydraulic circuit of a conventional hydraulic controller for an automatic transmission.
Figure 4:
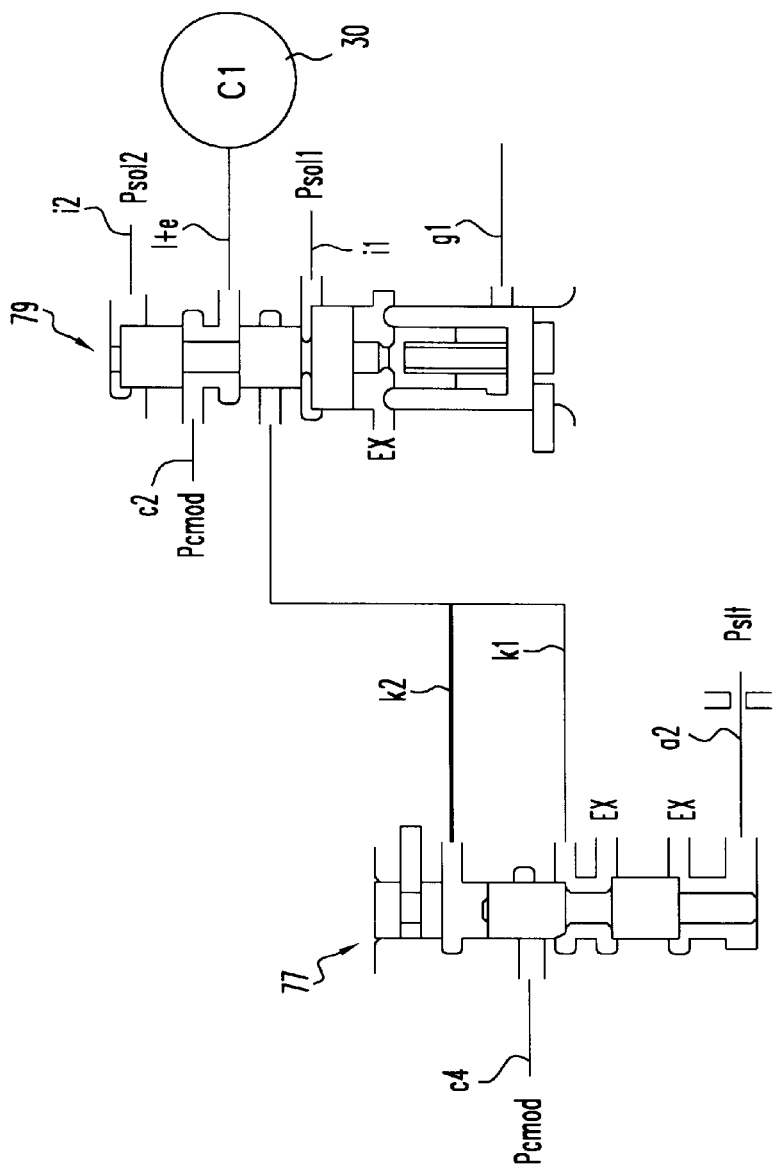
FIG. 4 is a diagram showing a part of the hydraulic circuit of FIG. 3.

First, a hydraulic controller 1 for a continuously variable transmission mechanism according to the present invention will be explained with reference to FIGS. 1 and 2 which show the hydraulic circuit of the hydraulic controller. Note that components which are the same as those of the Related Art of FIGS. 3 and 4 are described using the same numerals. The hydraulic controller includes a plurality of valves and oil passages and the like in addition to the components shown in FIG. 1. However, for the sake of convenience, explanation thereof will be omitted.

A linear solenoid valve SLT outputs a signal pressure (SLT pressure) Pslt based on throttle opening or the like, a secondary sheave control valve (second control valve) 73 controls hydraulic pressure supplied to a moveable sheave of a pulley of the continuously variable transmission mechanism, and manual shift valve 75 is switched by a driver's operation of a shift lever or the like. A clutch modulator valve 76 (pressure regulating valve) adjusts hydraulic pressure (line pressure PL) from a hydraulic pressure generating source including an oil pump, a primary regulator valve, and a secondary regulator valve or the like (not shown), and outputs the adjusted hydraulic pressure, as the so-called clutch modulator (range) pressure Pcmod, to a hydraulic servo 30, of a clutch (friction engagement element) C1 engaged in forward, or to a hydraulic servo 31 of a brake (friction engagement element) B1 engaged in reverse.

A control valve (first control valve) 77 adjusts the hydraulic pressure from the hydraulic pressure generating source, as previously adjusted by the clutch modulator valve 76, to provide control pressures to the hydraulic servos 30, 31, output in switching between the clutch C1 and the brake B1 or the like, that is, in a starting state. Relay valve 79 (switching valve) switches between the range pressure and the control pressure. Since the control valve and the relay valve are mainly used at the time of entering or leaving a garage or the like, the control valve 77 is referred to as a garage shift control valve and the relay valve 79 is referred to as a garage shift valve for convenience.

It is to be noted that, in the embodiment, the starting state is a state continued until a shift lever (not shown) is moved to a D range or an R range, and the clutch C1 and the brake B1 are engaged due to the control pressure of the garage shift control valve 77. The running state is a state other than the starting state, in which the clutch C1 and the brake B1 are engaged by a supply of range pressure through garage shift valve 79.

Solenoid valves SOL1 and SOL2 receive a hydraulic pressure output from a solenoid modulator valve (not shown) and respectively output signal pressures Psol1, Psol2 for switching a lockup control valve and the garage shift valve 79, which are normally closed type valves and which ON-OFF control a hydraulic pressure. Reference numeral 78 denotes an orifice, reference numeral 85 denotes a strainer, and reference numeral 35 denotes a hydraulic actuator (hydraulic servo) of the secondary sheave (pulley). Other components are referenced in FIG. 1 using common hydraulic symbols.

A predetermined hydraulic pressure is generated by the oil pump (not shown) driven by the engine, and the hydraulic pressure is adjusted to a line pressure (PL) based on the SLT pressure Pslt from the linear solenoid valve SLT controlled by a signal from a controller, which is calculated based on a pulley ratio or the throttle opening (that is, an input torque). In addition, the SLT pressure Pslt from an output port a of the linear solenoid valve SLT is supplied to a control oil chamber 73a of the secondary sheave control valve 73 through an oil passage a1.

The SLT pressure Pslt from the linear solenoid valve SLT is supplied to a control oil chamber (a first control oil chamber) 77a of the garage control valve 77 through an oil passage a2. The valve 77 adjusts the range pressure which has been input into a port 77b from an oil passage c4, to generate a direct control pressure (clutch control pressure) which it outputs from a port 77d, and supplies it to a port 79e of the garage shift valve 79 through an oil passage k1.

In the clutch modulator valve 76, the line pressure PL is input into a port 76a and is output as the range pressure Pcmod from a port 76b, through oil passage c1 and a strainer 85, to an oil passage c2 or the oil passage c4 and the range pressure Pcmod from the port 76b is input into control oil chamber 76c. In addition, a spool is biased toward the control oil chamber 76c by a spring 76d, and a hydraulic pressure from a reverse port R of the manual shift valve 75 is supplied to the other control oil chamber 76e through a small-diameter plug, via an oil passage b. Therefore, when the line pressure PL is low, the feedback pressure acting on the control oil chamber 76c does not overcome the force of the spring 76d, and the clutch modulator valve 76 is in the left half position and outputs the range pressure Pcmod which is substantially the same as the line pressure PL. However, when the line pressure PL increases, the feedback pressure increases in accordance with the line pressure. Then, when the feedback pressure overcomes the load of the spring 76d, the clutch modulator valve 76 outputs the substantially fixed range pressure (predetermined pressure) Pcmod as a balance of the spring 76d and the feedback pressure of the control oil chamber 76c.

The range pressure Pcmod of the oil passage c1 is input into an input port c of the linear solenoid valve SLT through the strainer 85 and an oil passage c3, and also is input into a solenoid modulator valve (not shown). The solenoid modulator valve reduces the range pressure Pcmod by a predetermined amount, and supplies it to each of the solenoid valves SOL1, SOL2, and an control oil chamber 73e of the secondary sheave control valve 73, as a solenoid modulator pressure Psolmod.

The secondary sheave control valve 73 inputs the SLT pressure Pslt into the control oil chamber 73a through the oil passage a1 and the solenoid modulator pressure Psolmod into the control oil chamber 73e so that the SLT pressure Pslt and the solenoid modulator pressure Psolmod act on opposing sides of the spool 73c. The secondary sheave control valve 73 adjusts the line pressure PL input at port 73b to a pressure for the secondary sheave based on the off-setting hydraulic pressures of the control oil chamber 73a and the control oil chamber 73e, and outputs the adjusted line pressure at port 73c to the secondary side hydraulic actuator 35.

The signal pressure Psol1 of the solenoid valve SOL1 is fed to a control oil chamber 79f of the garage shift valve 79 through an oil passage i1, and the signal pressure Psol2 of the solenoid valve SOL2 is fed to a control oil chamber 79c of the garage shift valve 79 through an oil passage i2. As a result, the switch position of the garage shift valve 79 is controlled based on the signal pressures Psol1, Psol2 output from the solenoid valve SOL1 and the solenoid valve SOL2.

When the garage shift valve 79 is in the left half shown position, the port 79e communicates with the port 79b, and the direct control pressure of the garage shift control valve 77, controlled by the SLT pressure Pslt of the linear solenoid valve SLT, is input through the oil passage ki and is output to a port PM of the manual shift valve 75 through an oil passage 1. In the D range and the R range in this state, the hydraulic servos 30, 31 of the clutch C1 and the brake B1 are directly controlled by the SLT pressure Pslt of the linear solenoid valve SLT. Thus, the engagement state of the clutch C1 and the brake B1 is controlled by the SLT pressure Pslt of the linear solenoid valve SLT output based on a throttle opening, particularly at the time of switching between the D range and the R range and in starting.

The direct control pressure output from a port 79b of the garage shift valve 79 is input into a control oil chamber (the second control oil chamber) 77c, in opposition to the pressure in control oil chamber 77a, of the garage shift control valve 77 through the oil passage 1 and an oil passage m. Thus direct control pressure output from the garage shift control valve 77 is fed back and, as in the conventional hydraulic controller (refer to FIGS. 3 and 4), feedback control is performed by the garage shift control valve 77.

When the garage shift valve 79 is in the right half shown position, a port 79a communicates with a port 79b, and the range pressure Pcmod from the clutch modulator valve 76, based on the primary regulator valve, is output to the port PM of the manual shift valve 75. In D range and in R range, the hydraulic servos 30, 31 of the clutch C1 and the brake B1 are controlled by the range pressure Pcmod of the clutch modulator valve 76. Thus, the engagement of the clutch C1 and that of the brake B1 are controlled by a substantially fixed range pressure Pcmod from the clutch modulator valve 76. As a result, the hydraulic servos 30, 31 of the clutch C1 and the brake B1 are prevented from being over-pressurized, and the engagement state of the clutch C1 and that of the brake B1 are maintained, especially in a state where the vehicle is running.

As mentioned above, in order to control hydraulic servo 35 of the secondary sheave and thereby control torque capacity (supporting force) of the pulleys, the SLT pressure Pslt output from the linear solenoid valve SLT is input into the control oil chamber 73a of the secondary sheave control valve 73. Therefore, the direct control pressure from the garage shift control valve 77 is shut off by the garage shift valve 79, and the linear solenoid valve SLT outputs the SLT pressure Pslt, controlled based on the throttle opening or the like, even where control by the garage shift control valve is not required. As a result the SLT control pressure Pslt is input into the control oil chamber 77a of the garage shift control valve 77.

Figure 2:
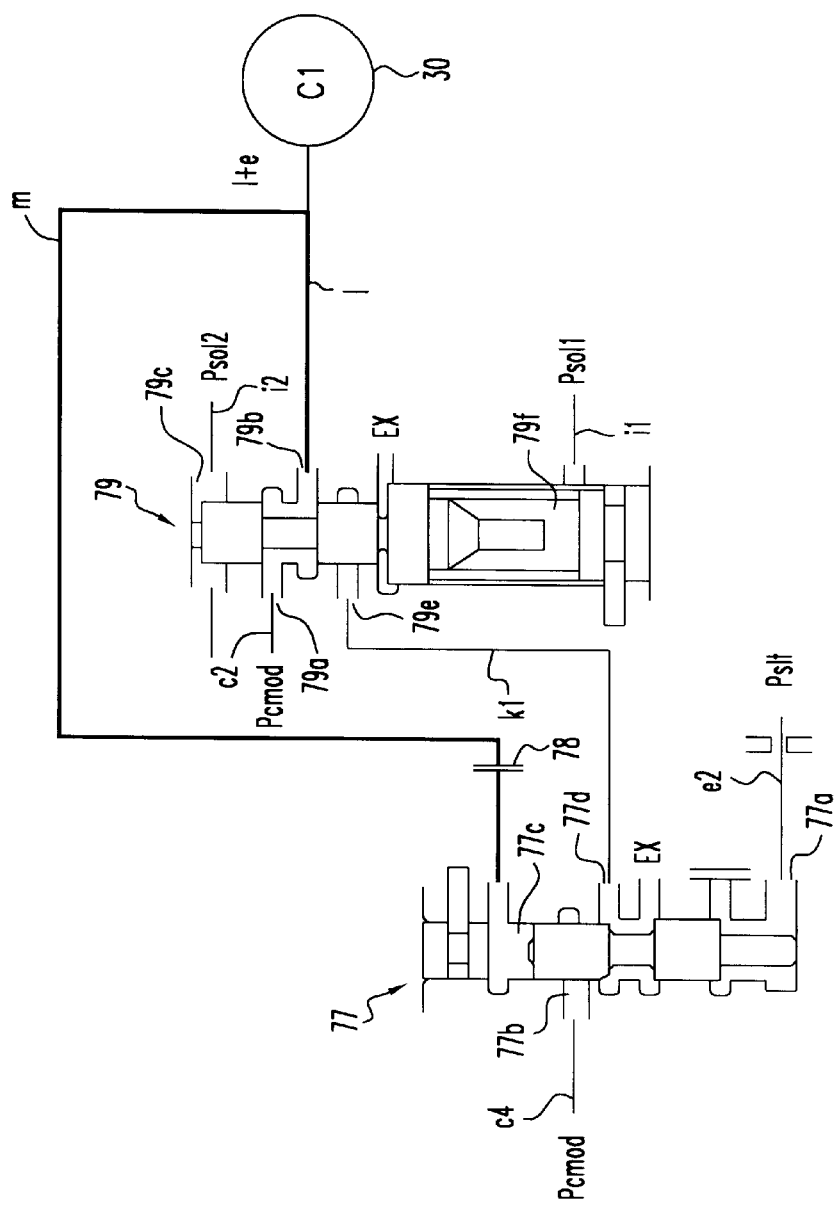
FIG. 2 is a schematic diagram showing a part of the hydraulic circuit of FIG. 1.

However, as shown in FIG. 2, the range pressure Pcmod output from the port 79b of the garage shift valve 79 is input into the control oil chamber 77c, in opposition to the pressure in control oil chamber 77a, of the garage shift control valve 77 through the oil passage 1 and the oil passage m. The range pressure Pcmod, which is higher than the SLT pressure Pslt, is input into the control oil chamber 77c, and the garage shift control valve 77 is fixed in the right half shown position. As a result, the range pressure Pcmod input into the port 77b is shut off, which prevents the oil supplied from the clutch modulator valve 76, that is, the oil supplied from the oil pump, from draining out the drain port EX.

The direct control pressure or the range pressure Pcmod output from the port 79b of the garage shift valve 79 is input into the port PM of the manual shift valve 75 through the oil passage 1. The manual shift valve 75 moves in accordance with the shift lever (not shown), to bring the port PM into communication with port D to supply the direct control pressure or the range pressure Pcmod to the hydraulic servo 30 of the clutch C1 through an oil passage d, when a driver selects the D range using the shift lever. Also, when the driver selects the R range using the shift lever, the manual shift valve 75 brings the port PM into communication with port R to supply the direct control pressure or the range pressure Pemod to the hydraulic servo 31 of the brake B1 through an oil passage e. When the driver shifts from the D range or the Range to another range using the shift lever, the hydraulic pressure of the hydraulic servo 30 or the hydraulic servo 31 is drained from the drain port EX of the manual shift valve 75 through the oil passage d or the oil passage e.

As mentioned above, the hydraulic controller 1 for an automatic transmission according to the present invention includes the oil passage m which inputs the output of the garage shift valve 79 into the control oil chamber 77c of the garage shift control valve 77. The hydraulic controller makes the direct control pressure act on the control oil chamber 77c to feedback-control the garage shift control valve 77, when the garage shift valve 79 outputs the direct control pressure from the garage shift 30 control valve 77, and makes the range pressure Pcmod act on the control oil chamber 77c to fix the garage shift control valve 77 when the garage shift valve 79 outputs the range pressure Pcmod. Therefore, when the direct control pressure output from the garage shift control valve is used, feedback-control is established. On the other hand, when the direct control pressure is not output from the garage shift control valve 77, the garage shift control valve 77 can be fixed. This makes it possible to prevent unnecessary oil drainage without adjusting the pressure of the garage shift control valve 77, which results in a reduction of oil consumption in hydraulic controller 1 and enhancement of fuel economy due to a size-reduction in an oil pump and an increased efficiency of the oil pump.

Also, the linear solenoid valve outputs the SLT pressure Pslt to a plurality of valves, that is, the garage shift control valve 77 and the secondary sheave control valve 73. Therefore, for example, if the garage shift control valve 77 is not fixed, when the torque capacity of the pulleys is controlled by controlling the secondary sheave control valve 73 by the linear solenoid valve SLT, the garage shift control valve simultaneously adjusts the direct control pressure as well. However, since the garage shift control valve 77 can be fixed, it is possible to prevent unnecessary oil drainage without adjusting the direct control pressure, which results in a reduction of an oil consumption in a hydraulic controller 1 for an automatic transmission and enhancement of fuel economy due to a size-reduction in an oil pump and an increased efficiency of the oil pump.

In the foregoing preferred embodiment, the hydraulic controller has been described as providing feedback-control of the garage shift control valve 77 and fixation of the garage shift control valve 77 in a continuously variable transmission mechanism. However, the hydraulic controller of the present invention may be applied to any device as long as the device executes the feedback-control when the control valve is used, and fixes the control valve when the control valve is not used. Also, in the foregoing embodiment, the hydraulic controller has a linear solenoid valve which outputs the SLT pressure Pslt to the garage shift control valve 77 and the secondary sheave control valve 73. However, the invention is not limited to this, and any plurality of valves may receive the control pressure from the one solenoid valve.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The disclosure of Japanese Patent Application No. 2001-395297 filed on Dec. 26, 2001, including the specification, drawings and abstract, is incorporated herein by reference in its entirety.

What is claimed is:

1. A hydraulic controller for an automatic transmission, which controls a hydraulic pressure received from a hydraulic pressure generating source, comprising:
   a solenoid valve which outputs a signal pressure;
   a first control valve having a first oil chamber and a second oil chamber, arranged in opposition to the first oil chamber, said first oil chamber receiving the signal pressure of the solenoid valve, said first control valve receiving and adjusting the hydraulic pressure from the hydraulic pressure generating source responsive to the signal pressure;
   a switching valve receiving the hydraulic pressure of the hydraulic pressure generating source and the hydraulic pressure adjusted by the first control valve, and selectively outputting one of the received hydraulic pressures; and
   an oil passage which receives the output of the switching valve and inputs it into the second oil chamber of the first control valve, wherein when the switching valve outputs the adjusted hydraulic pressure, the hydraulic controller feeds the adjusted hydraulic pressure to said second oil chamber to feedback-control the first control valve, and when the switching valve outputs the hydraulic pressure of the hydraulic pressure generating source, the hydraulic controller feeds the hydraulic pressure of the hydraulic pressure generating source to said second oil chamber to fix the first control valve.

2. The hydraulic controller for an automatic transmission according to claim 1, wherein the solenoid valve outputs the signal pressure to a plurality of valves.

3. The hydraulic controller for an automatic transmission according to claim 2 in which the automatic transmission is a continuously variable transmission having a belt passing around two pulleys and which changes the effective diameter of a pulley to change speed, further comprising:

a hydraulic servo for control of the effective diameter of a pulley responsive to a supplied hydraulic pressure; and a second control valve which controls the hydraulic pressure supplied to the hydraulic servo responsive to the signal pressure of the solenoid valve, whereby the plurality of valves to which the solenoid valve outputs the signal pressure are the first control valve and the second control valve.

4. The hydraulic controller for an automatic transmission according to claim 1, wherein the automatic transmission includes a friction engagement element which is engaged at the time of starting, said hydraulic controller further comprising:

a pressure regulating valve which adjusts the hydraulic pressure of the hydraulic pressure generating source to a predetermined pressure and outputs it to the first control valve and the switching valve, wherein the first control valve further adjusts the hydraulic pressure, as previously adjusted by the pressure regulating valve, based on the signal pressure of the solenoid valve, and outputs the further adjusted hydraulic pressure to the friction engagement element in starting, and wherein the switching valve switches to the hydraulic pressure adjusted by the pressure regulating valve and outputs it to the friction engagement element in running.

* * * * *